Aug. 14, 1956 H. A. TOULMIN, JR 2,758,952
STRUCTURAL MATERIALS PARTICULARLY
USEFUL AS PROTECTIVE ARMOUR
Filed June 25, 1954 3 Sheets—Sheet 2

*INVENTOR.*
HARRY A. TOULMIN JR.
BY *Toulmin & Toulmin*

ATTORNEYS

Aug. 14, 1956 — H. A. TOULMIN, JR — 2,758,952
STRUCTURAL MATERIALS PARTICULARLY USEFUL AS PROTECTIVE ARMOUR
Filed June 25, 1954 — 3 Sheets-Sheet 3

*INVENTOR.*
HARRY A. TOULMIN JR.
BY Toulmin & Toulmin
ATTORNEYS

2,758,952
Patented Aug. 14, 1956

2,758,952

STRUCTURAL MATERIALS PARTICULARLY USEFUL AS PROTECTIVE ARMOUR

Harry A. Toulmin, Jr., Dayton, Ohio, assignor to The Commonwealth Engineering Company of Ohio, Dayton, Ohio, a corporation of Ohio Application June 25, 1954, Serial No. 439,334

20 Claims. (Cl. 154—101)

This invention relates to structural materials and more particularly to structural materials which are useful as armour plate, the construction and arrangement of the components providing for high resistance to the passage therethrough of moving objects.

The invention particularly contemplates the provision of novel materials which are useful structurally and which absorb shock smoothly, are of high impact resistance and are relatively light in weight. The combination of components to attain these features includes a novel arrangement of light weight fibrous material, screen material, and usually a suitable plastic bonding agent as sheathing.

The invention also contemplates the provision of novel methods for the attainment of the above referred to products of invention.

The invention further contemplates the provision of novel apparatus arrangements which contribute to the facile attainment of the methods and products of invention.

In essence the invention contemplates a novel use of a screen or mesh material which is most suitably of metal, although other rigidized screen materials may be employed. Alloy steels having a high degree of flexibility in perforated sheet form may be utilized, or chain steel meshes may be employed.

The fibers are blown onto this screen and adhered thereto either with or without the aid of a bonding agent. Most suitably the velocity of the blown fibers is such that the fibers enter into and pass through the openings of the screen and a continuous layer of fibrous material intimately secured to the screen is thus attained.

This combination of screen and blown fibers in mat form is heated and subjected to an atmosphere of a heat decomposable metal bearing compound; usually with the blown fibers some interstices will be present, as will be noted more particularly hereinafter, and the gaseous compound permeates the same to some extent and forms across the mat of fibers a layer of metal which is intimately bonded to the fibers and may be in metallic contact with metal deposited interiorly of the fibers. Where the fibers are relatively open and fluffy the metal will extend interiorly through the fibers from the deposited metal to the screen itself.

The metal layer over the fibers is continuous and preferably thin relative to the mat and screen, but is of high tenacity rendering it particularly resistant to shearing by projectiles and the like. Thus a projectile striking the combination described may cause a hole in the thin metal surface, which metal is then compressed by the force of the projectile inwardly towards the mat and which in turn is driven into the screen opening.

The total effect is a relatively slow compression of the structure under the influence of the projectile and while the metal coating on the fibers may be cut through its action in cooperation with that of the fibers is to inhibit the passage materially of the projectile. In effect the metal and fibers ride with the projectile to some slight extent which reduces its speed, the screen barrier completing the stopping of the projectile motion.

Interiorly, cross linking of the metal which particularly occurs in the fibers when the same are light and fluffy assists the cushioning action and the stopping, the fluffy fibers being easily driven into the openings of the screen where they become tightly wadded and highly resistant to the passage of the moving object. The fibers are thus actually jammed into the screen openings, filling the same partially solid with the fibrous material, which nevertheless retains some degree of resilience, which exhibits the appearance of a tightly wadded ball of cotton.

The fibers which accomplish this effect may be long or short or may be mixtures, but generally I prefer to employ relatively short fibers, of a length of about 1/16 to 3/4 of an inch, as they respond more readily to compaction and interlacing which contributes to the desired result.

The fiber mats most useful for the attaining of cross bridging of deposited metal are those which contain at least some of the longer fibers as the interlacing of the long fibers with the short fibers tends to create gas permeable interstices in which metal may be deposited from the heat decomposable metal bearing compound.

I also prefer to employ glass fibers and/or synthetic silica fibers as they are highly resistant to heat, impervious to a large degree to physical action when in mat form, and are chemically resistant except for the alkali glasses. However, the alkali glasses may be employed when sheathed in plastic as any tendency to leach alkali is avoided with such construction, as will be noted more particularly hereinafter. However, other fibrous materials which may be readily wadded and which are sufficiently thermally resistant to withstand the necessary metal plating temperatures are useful.

As metal I prefer to employ nickel or iron as each is readily obtainable in pure form from their respective carbonyls. However, other metals such as copper, molybdenum, tungsten, titanium are of value and where high temperature resistance is required tungsten, for example, is most useful in conjunction with silica fibers.

Most suitably the metallized fibrous layer and screen in combination are coated with a resinous material which serves to bond the components and is advantageous in permitting handling of the completed structure as well as providing resistance to atmospheric attack. Further, heavy plastic coatings of the thermo-plastic type permit ready welding of the completed units into an assembly. The resin however may also be thermo-setting and where temperature resistance is a factor the structural member is preferably bonded with the thermosetting resin, and for most applications it may be said that the thermosetting resin is to be preferred.

I prefer to employ as a thermosetting resin a polyester having a high degree of adherence to metal, such as that described in the co-pending application of M. J. Hiler et al., Serial No. 338,155, filed February 20, 1953, and assigned to the same assignee as the present invention.

Most suitably the thermosetting resins comprise those polyesters which are adherent to metal and particularly those polyesters described in co-pending application of Hiler et al., referred to hereinbefore. As set forth in that application these polyesters include liquid blends of an alkyd resin with vinyl-substituted heterocyclic tertiary amines. Specifically the alkyd for the purpose is made up of groupings containing alcohol and acid units, the molecular weight as measured by the acid value of the resin being suitably over 500, those of about 1000 being most generally preferred, as they are blendable with the vinyl-substituted heterocyclic tertiary amine in conventional mixing apparatus.

Examples of the vinyl-substituted heterocyclic tertiary amines includes the vinyl pyridines, for instance, 2-vinylpyridine, 5-vinyl-2-methylpyridine, 5-ethyl-2-vinylpyridine, and the vinylpyridines and their alkyl nuclearly substituted derivatives generally in which the alkyl radicals contain from 1–4 carbon atoms, the vinylimidazoles, the vinylquinolines, the vinylisoquinolines, the vinylthiazoles, the vinyl oxazoles, the vinyl benzo-oxazoles, etc.

Examples of the alkyds which are blendable with the foregoing tertiary amines include alkyd resin precondensates of the modified or unmodified type containing as the alcohol the polyhydrics, for example, ethylene glycol, di-, tri-, and tetra-ethylene glycol, propylene glycol, dipropylene glycol, trimethylene glycol, glycerol and pentaerythritol. Suitable acids for the formation of the precondensates with the above noted alcohol include maleic, fumaric, methylethyl maleic, diethyl maleic and mesaconic.

In polyesters such as the styrene-unsaturated allyl copolymers may also be employed, as may for example, the di-allyl phthalics. Other resins which are suitable for coating include the poly-styrenes and polyamides, and when such are employed the product of invention is subjected to pre-forming in the usual manner of the art and are particularly subject to those operations wherein high frequency pre-heating is employed to effect the molding operation.

The screening itself which as already noted is most suitably of an alloy steel, may also be of other materials, notably aluminum, which provides the advantage of lightness in weight. In general, in screen form, the steel is sufficiently light in weight, is cheap, and commercially available in many specific forms. Where, however, other factors become dominant the screening may suitably be of other materials than aluminum to achieve an optimum light weight structure. For example, when the product is to be utilized as plating of armoured vehicles or ships steel may suitably be employed; but where the product is to be in the form of a vest, for example, or is to be utilized in aircraft where minimum weight is essential, aluminum is quite suitable; in fact other materials such as plastic may be utilized as the screen by modification of the principles of the invention.

Desirably the screen itself is formed in such manner that openings are provided not only in the plane of the surface of the screen but also transversely thereto; this is effected by employing screening in which the relative portions are bent back on themselves and hooked together, the hooks forming the openings which receive fibers of the mat bound therein and extending transversely to the greater portion of the fibers extending through the openings of the screen.

In the practice of the method of the invention the fibers are suitably blown against the screen and the same are heated by heat from the screen as well as by external means to the temperature of decomposition of a heat decomposable metal bearing gas. The metal and screen in their heated condition are then subjected to the atmosphere of the metal bearing gas and the gas enters the interstices of the mat of fibers as already noted to deposit metal therein, metal also being deposited as a coating over the fiber surface. This composite structure may be then subjected to a bath of resin to attain an overall protective plastic or resin coating. Where optimum resistance is desired to penetration by moving objects the composite assembly without the resin may be first cut into slabs and suitably layered upon itself, whereafter the assembled structure is immersed in a resin bath to attain a complete resin coating, and thereafter cured.

The invention will be more fully understood by reference to the following detailed description and accompanying drawings wherein:

Figures 1a and 1b illustrate portions of the apparatus of Figure 1;

Figure 9:
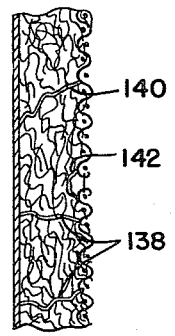
Figure 7:
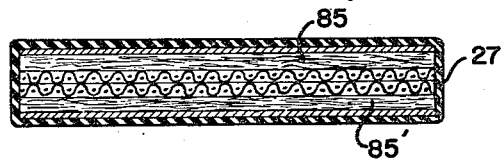
Figure 5:
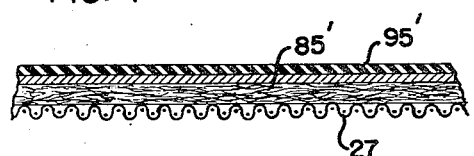
Figure 6:
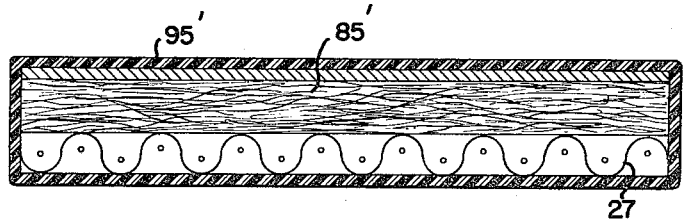
Figure 8:
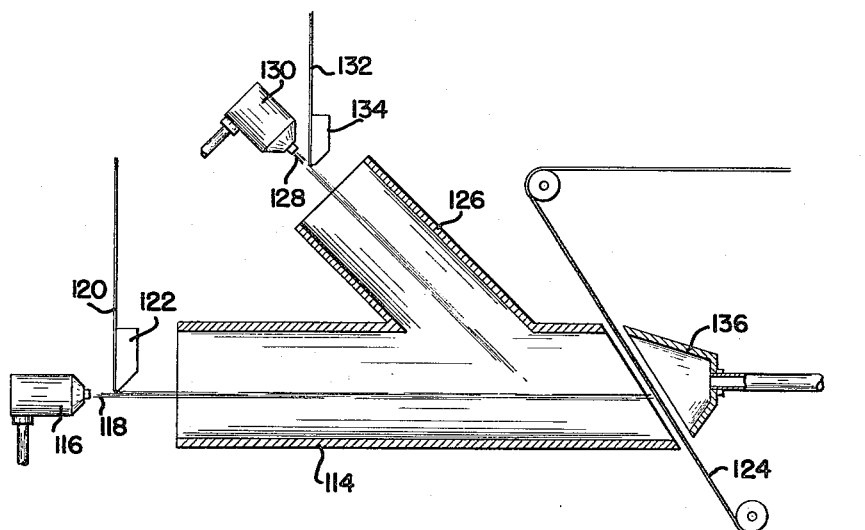
Figure 10:
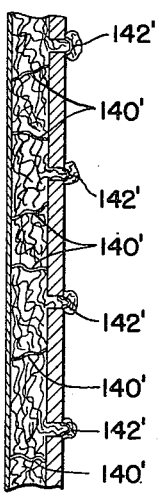

Figures 5–7, inclusive, and 7a, are cross sectional views of products produced in accordance with the invention;

Figure 8 is a schematic view of a portion of apparatus useful in the practice of the invention adapted to produce a further embodiment of the product of invention;

Figure 9 is a sectional view of the product of invention produced with the apparatus of Figure 8; and Figure 10 is a similar sectional view as Figure 9, illustrating a modified construction.

Figure 1:
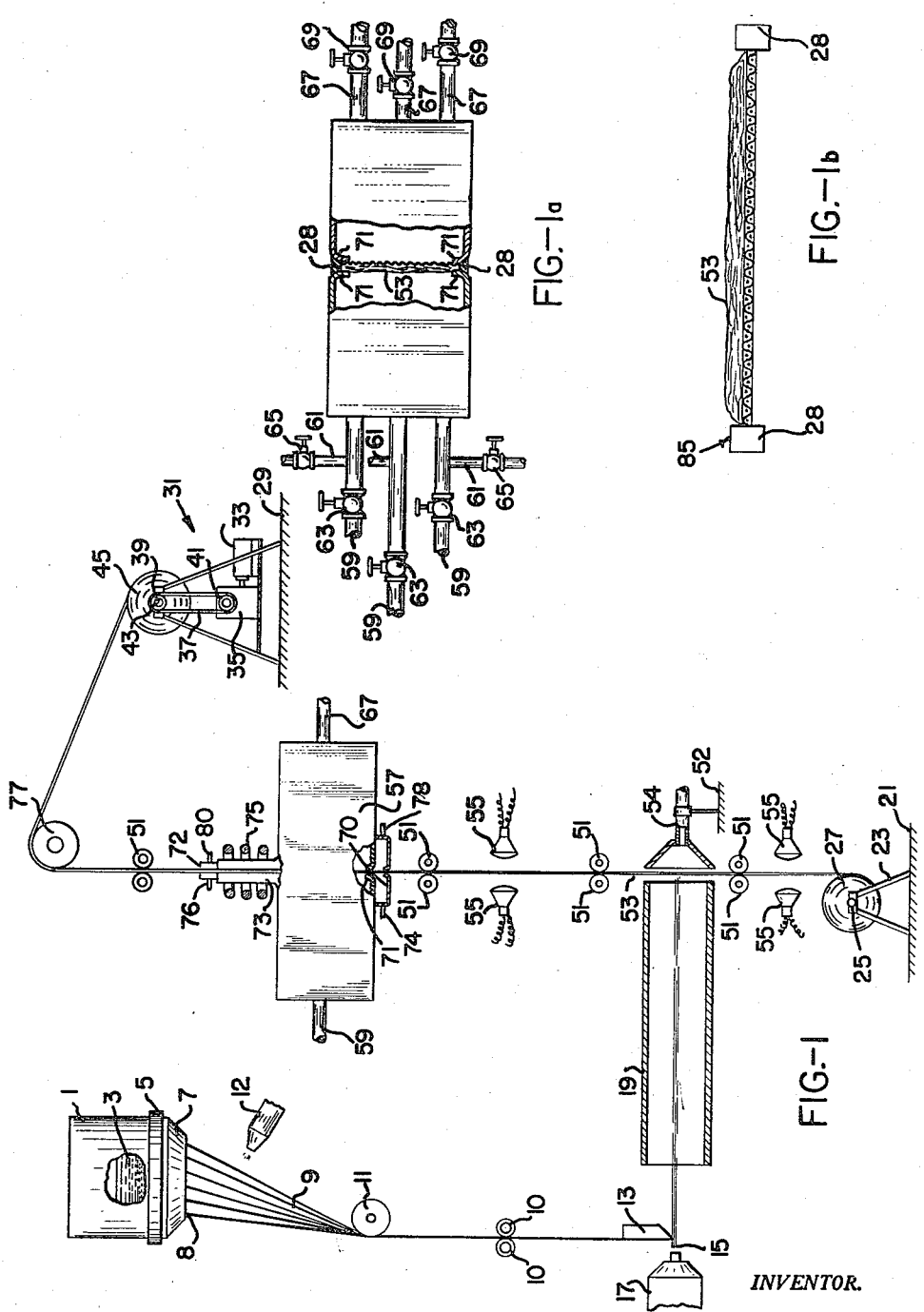
Figure 1 is a schematic view in elevation of apparatus useful in the practice of the invention.

Referring to the drawings, particularly to Figure 1, there is shown at 1 the usual platinum pot of the glass industry for the retention of a body of molten glass 3, the pot being electrically resistance heated by means of electrodes 5 in known manner.

The pot 1 is provided with a bushing 7 apertured therethrough to permit molten glass to exude as indicated at 8 to be drawn into filaments 9 by drawing rolls 10 driven from a source (not shown). The glass solidifies quickly as it passes downwardly from the bushing 7 over guide roll 11 to the drawing rolls 10.

Guide roll 11 serves to align the filaments in parallel relation and they are presented to the block guide 13 in this parallel relation and exposed to the hot blast 15 of gases emanating from a burner 17. If desired the filaments in their passage may be treated with a lubricant by spray 12 and such will be burned off by a gaseous blast. The gaseous blast suitably has a temperature at the guide block of about 3100 to 3300° F. and the blast has a velocity in the range of about 1200 to 1800 feet per second.

The extremely thin filaments which may be on the order of 0.004 to 0.009 inch, for example, are softened in the blast and highly attenuated thereby and blown into the conduit 19. Suitably supported at 21 is a frame 23 having a shaft 25 on which a reel of wire mesh or screen 27 is mounted. Supported at 29 above the reel of wire and indicated generally at 31 is a driving assembly comprising a suitable electric motor 33, gear box 35, belt 37 and pulleys 39, 41, pulley 41 being secured to a shaft 43 for the drawing of a wind-up reel 45. Thus actuation of the motor 33 permits the wire to be drawn upwardly and reeled at 45 as indicated in the drawing.

The wire is supported in its traverse by a series of rollers 51 suitably spaced to prevent flapping movement of the wire and where the wire is extremely heavy these rollers may be driven in synchronism with the reel 45 and may if desired be heated in order to supply heat to the wire for purposes described more particularly hereinafter. However in the present instance such driving rotation of the supporting rolls and heating thereof is not necessary.

The wire in its upward passage crosses the end of the conduit 19 and the small highly attenuated fibers are blown onto the screen or mesh to form a mat indicated at 53. Suitably supported at 52 is a vacuum conduit 54 connected to a pump source (not shown) and this vacuum assists the movement of the fibers to the screen.

Figure 2:
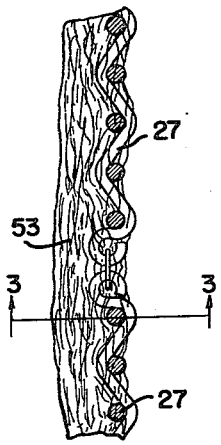
Figure 2 is a sectional view illustrating a product produced with the apparatus of Figure 1.
Figure 3:
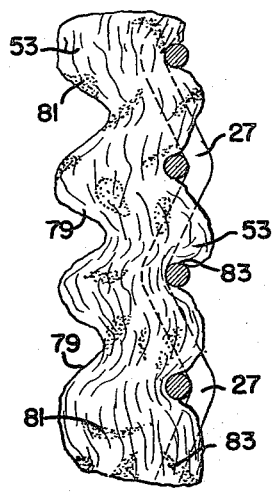
Figure 3 is an enlarged sectional view of the structure of Figure 2.

As shown more clearly in Figures 2 and 3 the velocity of the fibers causes them to be drawn around the wire forming the screening and to interlock both with the wire and themselves. Also some of the fibers enter, as most clearly shown in Figure 3, the openings of the screen. Also as shown in Figure 3 the screening is formed of wires which are hooked together and the hooked portions form spaces transverse to the general plane of the mat and some of the fibers enter this transverse spacing and accordingly extend transversely to the general plane of the matted fibers and tend to interlock therewith. Thus the mat of fibers is tightly adhered to the screen.

The screening, both in its passage towards the conduit and away from the same, is heated most suitably by infra-red lights 55 and the combination of mat and screen attain a temperature of about 375° F., prior to entry tion chamber 57. Chamber 57 as indicated in Figure 1a is provided with inlet ports 59 for the passage to the chamber of a suitable heat decomposable metal bearing gas, which in the present instance will be considered to be nickel carbonyl. Communicating with the inlet ports 59 are ports 61 for the passage into the chamber, when desired, of a suitable carrier gas for the nickel carbonyl, which in the present instance will be considered to be carbon dioxide. Ports 59 are provided with valves 63 and ports 61 are provided with valves 65. At the opposite end of the chamber the same is provided with ports 67 having valves 69 and these outlet ports are connected suitably to a source of vacuum as indicated by the legend.

Provided at 70 and 72 extending across the chamber 57, above and below the same, are gas seals having respectively inlet ports 74 and 76 and outlet ports 78 and 80. Carbon dioxide gas at slightly above atmospheric pressure flows continuously through the seals and entrance of air to the plating chamber is inhibited.

The screening 27 is provided laterally and on each of the opposed faces thereof with rubber gasket material 28 which extends through the screening and is adapted to seal against the inturned portions 71 of the glass forming the chamber 57 in order to inhibit leakage of gases from the chamber to the exterior of the apparatus.

Upon completion of the operation the side gaskets are expendable and are cut from the edges of the screen. Most suitably these edges are not contacted by the fiber as the screening passes the conduit 19, but are positioned just beyond the edges of the conduit so as not to be affected.

In the practice of the invention prior to the movement of the screening carrying the mat into the chamber 57 a length of screening is run through the chamber and the valves 69 are open to vacuum and the valves 65 are open to permit carbon dioxide only to flow into the chamber and the chamber is suitably exhausted of air. Then valves 65 are closed and the chamber evacuation continues to obtain a low pressure such as about one-tenth of a millimeter of mercury.

The filaments 9 are then fed into the blast, the fibers collected on the screening and the screening actuated by the powering of motor 33. The wire and the mat of fibers are drawn continuously into the chamber 57. As the mat enters the chamber nickel carbonyl is flowed in through conduit 59, valves 63 being open to permit a slow flow of carbon dioxide through conduit 61, the conduit 67 being connected to vacuum.

The nickel carbonyl when it contacts the heated material decomposes to deposit nickel therein and thereon. When the speed of movement of the screen is relatively slow, for example 2 feet per minute, the mat of fibers formed on the screen is relatively thick, for example a quarter of an inch, and in such mats small interstices tend to exist and the gaseous nickel carbonyl enters these interstices before decomposing and metal is deposited interiorly of the mat.

The temperature is highest approximately at the interface between the screening and the mat of fibers and accordingly deposition will take place always at least at the screening and most generally within the mat before the gases reach the screen. The surface temperature of the mat however must be sufficient to decompose the molecules of gas striking it, and accordingly a thin film of metal forms over the surface as well as in the interstices of the mat.

To insure of a completely coated surface the glass body forming the chamber 57 has upward extensions at 73 surrounded by induction heating coil 75 which is effective to heat the metal already deposited on the mat in the lower course of the chamber and accordingly the temperature of the combination is maintained high and metal continues to deposit to insure of a complete coating. The screening then passes upwardly through the upper rolls 51 over fixed roller 77 and is wound as at 45.

Referring more particularly to Figures 2 and 3 the screening 27 with the mat and metal thereon is indicated in section. The mat 53 it will be noted (Figure 3) tends to enter the openings of the screening and the metal 79 tends to follow the contour of the mat on the free face thereof. However interiorly as indicated at 81 the metal tends to permeate the mat in various directions and is effective to cross-link the fibers as well as to cross-link the metal 79 to the screening 27, as shown most clearly at 83.

The attainment of this cross-linkage is dependent upon the nature of the mat which is formed on the screening, as extremely thin mats which approach the translucent are merely coated with metal, as they apparently do not acquire sufficient interstices to be permeated by the gaseous compound. However, as the fibers tend to build up on each other on the screen some interstices develop as the thickness becomes greater than, for example, that of a thin sheet. This cross-linking between the fibers and between the screening and the deposited metal is considered to be of extreme importance with respect to the resistance of the completed product to moving objects.

Figure 4:
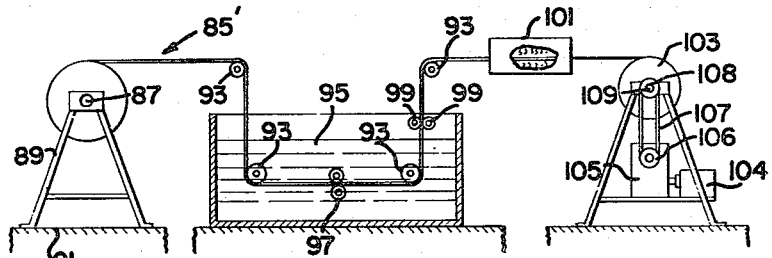
Figure 4 is a schematic view of apparatus useful in applying resin to the products of invention.

Referring now to Figures 1b and 4 there is indicated generally at 85 the composite assembly produced by the apparatus of Figure 1. The gasket material 28 on either side of the product is cut therefrom in any suitable manner as with rotating knives, for example, the metal and screening being sufficient to hold the fibers in position and to prevent undue fraying thereof during the cutting.

The composite product is preferably then supported on a reel on shaft 87 mounted on stand 89 supported as at 91 and the product generally indicated by the numeral 85 is passed over rollers 93 through a resin bath 95. This bath for the purposes of the present example contains a polyester resin which is highly adherent to metals and comprises a blend of an alkyd resin with a vinyl substituted-heterocyclic tertiary amine, for example, 4-vinyl-2-methyl pyridine. Most suitably 100 parts of the alkyd resin is present per 40 parts by weight of the methyl pyridine, and the alkyd resin itself suitably comprises equal molecular proportions of triethylene glycol and maleic acid. In practice this unmodified resinous polyester is prepared by heating together equal molecular proportions of triethylene glycol and maleic acid until a partially heated alkyd having the form of a resinous liquid is obtained; which is then mixed at room temperature in the noted proportions with the tertiary amine to form a clear resinous liquid.

The composite body passing into the bath is heavily coated with this resin which completely surrounds the same and permeates the fibers of the mat to some slight extent, a permeation which is desirable as it increases the bonding.

Most suitably squeeze rollers 97 are mounted in the bath to inhibit any tendency of the resin to separate the constituents of the composite, and other squeeze rollers are provided at 99 at the outlet of the bath to insure of complete compression of the material and to remove excess polyester from the product.

As shown in Figure 4 there is provided at the outlet of the bath at 101 an electrically heated oven which heats the product and at least partially sets the polyester prior to the winding thereof at 103. The power for winding is derived from motor 104 drivingly connected to gear box 105 which is itself provided with a suitable pulley 106 over which a belt 107 passes to pulley 108 on a shaft 109 of the wind-up mechanism.

The product of this latter resin treatment is indicated in Figure 6 and the composite 85' is shown to be completely encased in the solidified polyester 95'. Where desired, as illustrated in Figure 5, the product may have a coating of plastic on one side thereof only and this is most suitably accomplished by painting, spraying or roll coating the product 85' on one side only with a plastic or polyester such as that already described.

Figure 7A:
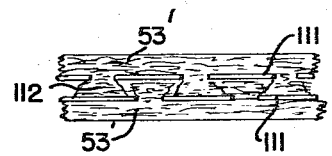

The product of Figure 7 is attained by doubling the composite 85' upon itself with the screen surfaces in contact and then subjecting the doubled length to a resin treatment as described in connection with Figure 4. This latter product may be very suitably formed with screening 111 shown more clearly in Figure 7a, the screening being merely very thin flat sheets provided, for example, with circular openings. When doubling the product upon itself one layer may be slightly displaced from the other so that the screening openings as indicated more clearly in Figure 7a do not coincide and the fluffy mats 53' tend to extend through these openings and to interlock the structure. Also in the final product this arrangement provides for much greater resistance for the passage of moving objects, not only due to the doubling of the layers, but due to the tendency of the fibers to spread along the width of the layers at the openings when the object strikes the same, as most clearly shown at 112 in Figure 7a.

Referring now to Figure 8 there is shown a portion of the structure of a further embodiment of the invention. This embodiment is important as it permits the production of mats having relatively long and relatively short fibers, the short fibers being suitably, for example, in the range of $1/16$ to $3/4$ of an inch and the longer fibers being suitably from about $3/4$ of an inch to $1\frac{1}{4}$ inches.

Referring now specifically to Figure 8 the conduit 114 has leftwardly thereof a burner 116, the hot gaseous blast 118 of which contacts a plurality of filaments indicated at 120 which are passing over the lower edge of block 122 and as indicated in the drawing the fibers are blown towards a screen 124 which passes angularly over the remote end of the conduit 114.

Extending from the conduit at 126 is an opening into which fibers may be driven by the hot gaseous blast 128 issuing from burner 130 and impinging against an array of parallel filaments indicated at 132 passing over the lower edge of guide block 134. The blast 128 is preferably of a lower temperature, approximately 2600–2800° F. and a lower velocity suitably 800–1000 feet per second, and accordingly the attenuation of the filaments 132 is less than that of the filaments 122, and longer, heavier lengths of glass fibers are produced in the opening surrounded by the conduit portion 126. The blast however is sufficient to drive the filaments towards the lower portion of the conduit 114 as shown in Figure 8, and further the high velocity of the blast issuing through the main portion of the conduit 114 tends to draw the filaments blown at guide 134 into the main channel, and consequently long and short fibers are deposited on the angularly moving screen 124.

A conduit 136 positioned behind the screen assists the drawing of all of the fibers through the screen and the angular movement of the screening tends to insure of interlacing of the long and short fibers as they are deposited on the moving screen. This interlacing creates interstices between the fibers which readily receive the heat decomposable gases to which they are exposed in the plating chamber, similar to that described in connection with Figure 1, but not shown in Figure 8. Thus a very adequate bridging arrangement between fibers and between the deposited metal coating for the fibers and the screen is achieved when the arrangement of Figure 8 is employed. Such a product is shown in enlarged view in Figures 9 and 10 wherein the bridging of the metal is most clearly indicated at 138 and 140, in Figure 9 and 140' in Figure 10.

It is to be noted in this respect that as shown in Figure 9 at 142 the edges of the screen openings and as shown also at 142' in the modified structure illustrated in Figure 10, are particularly receptive to the deposit of metal thereon which encourages a slight growth of metal at the edges in preference to the fibers and provides a further inhibiting medium for the passage of moving objects through the composition.

The structure of Figure 9 may of course be subjected to a resin treatment as already described in connection with prior figures and a completed product with the resin thereon is attained.

The products of invention due to their method of manufacture, which involves the deposition of the fibrous mat, the immediate heating thereof and the plating thereof, are substantially free of moisture and are particularly so when the resin is applied directly after the metallizing operation.

This is an important factor as the presence of moisture in the fibers tends to disrupt any bonding between the fibers. Glass itself does not readily take up moisture although some may creep in due to capillarity in ordinary processes, but such is inhibited in the present procedure.

The products may be utilized as armour plates on vehicles, ships, planes, personnel (vests) shielding, table tops, panels, cabinets, machine housings, automobile parts, drums, and for example, in any operation where a high impact resistance together with lightness in weight are requirements.

In many instances, as for example in table tops, the combination of the clear resins together with the deposited metal which is visible through the resin provide for the production of highly decorative articles and the metal employable may be selected to give particular decorative effects. Metals particularly useful are set forth in the following table in the form of the compounds from which they are derivable and set forth also are the preferred conditions for effecting the metal deposition:

| Plating material | System pressure, mm. of Hg | Temperature range of base materials in degrees Fahrenheit |
| --- | --- | --- |
| $Ni(CO)_4$ | 0.5–1.0 | 350–450 |
| $Cr(CO)_6$ | 0.5–1.8 | 375–450 |
| $Mo(CO)_6$ | 0.5–1.8 | 450–650 |
| $W(CO)_6$ | 0.5–1.8 | 525–775 |
| $Cu(C_5H_7O_2)_2$ | 0.5–1.8 | 400–750 |

In connection with the deposited metal it is to be noted that copper and gold provide an extremely attractive appearance when utilized with a clear resin and the tenacity of these films due to their method of production is extremely high, affording in combination with the fibers the required resistance and cushioning effects described hereinbefore.

It will be understood that this invention is susceptible to modification in order to adopt it to different usages and conditions and accordingly, it is desired to comprehend such modifications within this invention as may fall within the scope of the appended claims.

I claim:

1. As an article of manufacture, armour plate comprising a screen, a mat of fibers on said screen and adhering thereto, and metal bonded with the fibers and forming a continuous layer on the free face thereof.

2. As an article of manufacture, armour plate comprising a screen, a mat of fibers adherent on said screen and adhering thereto, said mat having gas permeable interstices between some of the fibers thereof, and a metal layer on the fibers bonded to the same defining a coating therefor, said metal forming a continuous layer over said fibers and extending into said interstices and at least partially filling the same and bonding the fibers together interiorly.

3. As an article of manufacture, armour plate comprising a screen, a mat of fibers on said screen and adhering thereto, said mat having gas permeable interstices between the fibers communicable to some extent with each other, and metal on the fibers bonded thereto and coating the same, said metal forming a continuous layer over said fibers and extending into the communicable interstices and bridging fibers defining the interstices.

4. As an article of manufacture, armour plate comprising a screen, a mat of fibers on said screen and adhering thereto, said mat having gas permeable interstices therein between the fibers, at least some of the interstices extending between the free face of the mat and the screen, and metal on the face of the mat coating the same and forming a continuous layer over said fibers and extending from the face to the screen in at least some of said interstices.

5. As an article of manufacture, armour plate comprising a screen, a mat of fibers on said screen and adhering thereto and extending into opening of the screen, and metal bonded with the fibers and forming a continuous metal layer over the face thereof and coating the same.

6. As an article of manufacture, armour plate comprising a wire mesh having openings in the plane of the mesh and other spacings formed by the wire of the mesh which provide for communication between mesh openings, a mat of fibers on the screen having some of the fibers extending into said openings through said spacings and entwined around the wire of the mesh tightly adhering the fibers to the screen, the exposed face of the mat remote from the screen having a metal coating bonded thereto and forming a continuous layer over said fibers and some of which metal extends into the mat to the screen to bridge spacings between the mat and screen.

7. As an article of manufacture, armour plate comprising a metal screen, a mat composed of long and short fibers adhering to said screen, said fibers being interlaced together to define interstices, metal on the surface of the fibers and forming a continuous layer over said fibers and extending into the interstices bridging the fibers.

8. As an article of manufacture which is projectile repellant, a pair of screens in back to back relation, fibers on each of the exposed faces of said screens in fiber mat form, the fibers of the mats extending through the screen openings towards each other and extending around the material defining the openings to interlock therewith, and metal coating each of the exposed faces of the mats and forming a continuous layer over said fibers and extending into the interstices thereof.

9. A composite body which is projectile repellant comprising a wire mesh, a mat of fibers overlying said wire mesh and having some of the fibers extending through openings of the mesh to entwine about the material defining the mesh, a coating of metal on the face of the mat forming a substantially continuous layer thereover, and a resin coating on the metal and adhered thereto.

10. A composite body which is projectile repellant comprising a wire mesh, a mat of fibers adhering thereon, a thin coating of metal on said mat forming a substantially continuous layer thereover, and a resin bonding the mesh, mat and metal together.

11. A composite body which is projectile repellant comprising in superposition a metal mesh, a mat of fibers on said metal mesh, a thin adherent coating of metal on the mat forming a substantially continuous layer thereover, and a transparent resin enclosing the whole and bonding the same together.

12. The method which comprises impinging fibers in an air stream onto a screen to cause the fibers to intertwine with the screen, continuing the impingement of the fibers to build up a mat of fibers on the screen which is adherent thereto, heating the mat and screen together, metallizing the mat of fibers and the screen by depositing metal from a thermally decomposable metal bearing compound onto the heated mat and screen forming a substantially continuous layer of metal over the face of said mat of fibers.

13. The method which comprises impinging fibers in an air stream onto a screen to cause the fibers to intertwine with the screen, continuing the impingement of the fibers to build up a mat of fibers on the screen which is adherent thereto, heating the mat and screen together, metallizing the mat of fibers and the screen by depositing metal from a thermally decomposable metal bearing compound onto the heated mat and screen forming a substantially continuous layer of metal over the face of said mat of fibers, and passing the metallized screen and mat through a resin bath to completely resin coat the same.

14. In a method of producing a mat of glass fibers in which long and short fibers are interlaced, the steps of establishing a pair of spaced hot gas blasts, feeding into the blasts filaments of glass which are softened and attenuated by the heat and force of the blast into short fine blown fibers, providing a structural base for receiving said blown fibers, and feeding other filaments into the second blast to form long fine blown fibers, the same being directed in such a direction that the blown fibers produced by the second blast are caused to mingle with the fibers of the first blast prior to receipt of the fibers of either blast on the receiving base structure.

15. In a method of producing a mat of glass fibers in which long and short fibers are interlaced, the steps of producing gaseous blasts one of which contains short fibers and the other of which contains longer fibers, providing a screen for receiving the fibers, intermingling while in their respective blasts the fibers of the blasts with each other, and collecting the intermingled fibers of different lengths on the receiving screen.

16. In a method of producing a metallized mat of fibers having long and short fibers, each of different diameter and in which mat the fibers define interstices, the method comprising forming gaseous blasts containing the fibers of different lengths and diameters, intermingling the blasts to form a single blast containing all the fibers, providing a foraminous base for receiving said fibers of the single blast, collecting the fibers in mat form on the receiving base and in interlaced relation, heating the mat, and depositing metal on and into the mat by exposing the heated mat to vapors of a metal bearing compound which is thermally decomposable at the temperature of the mat.

17. As a structural material, a composite body comprising a mat of glass fibers, a metal screen on one face of the mat, a continuous thin coating of nickel on the other face of the mat, and nickel penetrating the interstices of the fibers and bridging the same.

18. As a decorative material, a composite body comprising a mat of glass fibers, a flat metal screen on one face of the mat, a thin continuous film of nickel on the other face, and a transparent resin adhered to the nickel and the screen and through which resin and screen openings the fiber mat is visible.

19. A composite laminated structure useful as armour plate comprising a metal screen, a fibrous mat adherent to said screen, said mat of fibers being entwined and interlocked with said screen and of a thickness of at least one-quarter of an inch, said fibers having metal coating and metal forming a substantially continuous layer over the mat and following the contour surface of the same.

20. A composite laminated structure as defined in claim 19, wherein the fibers are glass fibers.

References Cited in the file of this patent

UNITED STATES PATENTS

| | | |
|---|---|---|
| 2,068,533 | Coffman | Jan. 19, 1937 |
| 2,073,334 | Coffman | Mar. 9, 1937 |
| 2,274,189 | Congleton | Feb. 24, 1942 |
| 2,466,567 | Kropscott et al. | Apr. 5, 1949 |
| 2,616,165 | Brennan | Nov. 4, 1952 |
| 2,658,848 | Labino | Nov. 10, 1953 |
| 2,670,554 | Francis | Mar. 2, 1954 |
| 2,699,415 | Nachtman | Jan. 11, 1955 |